Feb. 19, 1935. E. HOPE 1,991,930
APPARATUS FOR SPRAYING NOXIOUS WEED KILLING SOLUTIONS AND THE LIKE
Filed April 10, 1934
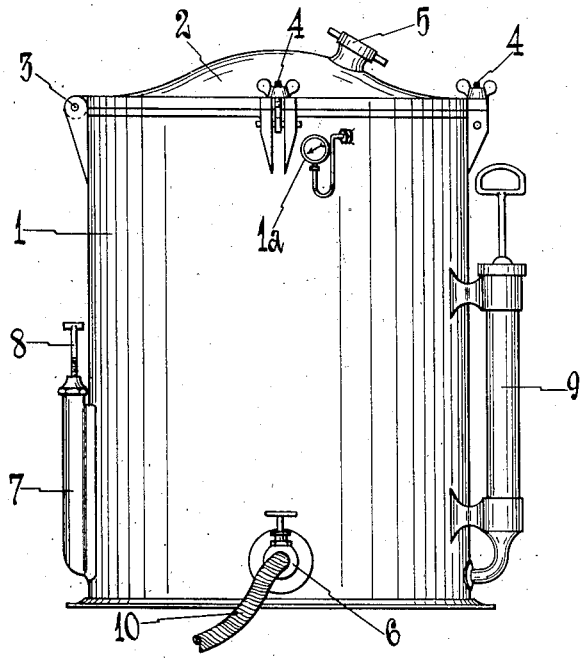
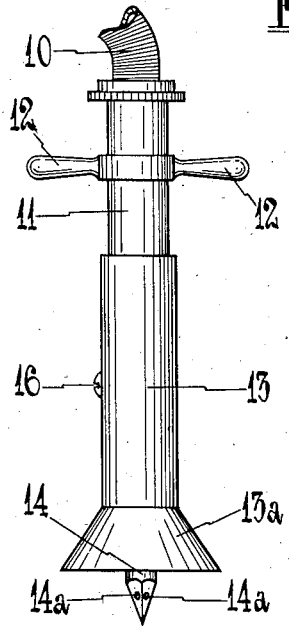
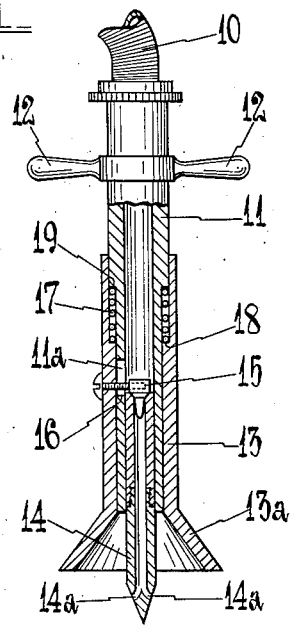
E. Hope
INVENTOR
By: Marks & Clerk
ATTYS.

Patented Feb. 19, 1935

1,991,930

UNITED STATES PATENT OFFICE 1,991,930

APPARATUS FOR SPRAYING NOXIOUS WEED KILLING SOLUTIONS AND THE LIKE

Edward Hope, Island Bay, Wellington, New Zealand

Application April 10, 1934, Serial No. 719,927

2 Claims. (Cl. 47—49)

The invention relates to apparatus for applying weed killing solutions, insecticidal and germicidal solutions to vegetable growth, and has for its object the provision of improved apparatus, which is particularly adapted for the root injection of weed killing or herbicidal solutions, and which may also be used to spray insecticidal and germicidal solutions.

The improved apparatus comprises a container for holding a solution under pressure, means on and in communication with said container for generating pressure therein and a director nozzle connected with said container having a solution discharge passage controlled by a valve operated from a sleeve slidable on said director nozzle.

In the accompanying drawing, in conjunction with which the invention will be further described, to enable it to be better understood:—

Figure 1 is an elevation of the container

Figure 2 an elevation of the director nozzle, and

Figure 3 a part elevation and part sectional elevation of the latter.

The container 1 is constructed to withstand any predetermined pressure (either gas or air, or gas and air combined) from within, and for convenience is provided with a domed top 2, hinged at 3, and adapted to be secured on the container 1 to close same by a suitable number of screw fastenings 4, packing being provided between the top 2 and upper edge of the container to ensure an air tight joint being made.

An opening in the top 2, closed by a screw cap 5 is provided for placing solution in the container 1, while near its bottom said container is fitted with a cock controlled outlet nipple 6, through which solution is enable to be discharged from the container 1. Pressure is generated in the container 1 by the use of that known form of gas container or "bomb" capable of being punctured to release its gas for injection into a liquid, and to enable this to be done the container 1 is fitted externally with a conventional bomb holder and puncturing device 7 in communication with the interior of the container 1, so that upon pressure being applied to the bomb in the device 7, per medium of the screw 8, said bomb is punctured and the gas contained therein is released for injection into liquid in the container 1.

A pressure gauge 1a is provided on the container 1 for indicating the pressure contained therein.

A suitable gas for injection into, or for charging or impregnating a solution for weed killing purposes, is sulphur dioxide, although any other gas suitable for the purpose may be used.

In order to enable air pressure to be generated in the container 1 instead of, or to supplement the gas pressure, an air pressure pump 9 is fitted to the container.

The director nozzle through which the solution is delivered, is fitted to the end of a flexible pipe 10 connected with the nipple 6, said director nozzle comprising a tube 11 provided with handles or grips 12, and having slidable thereon a sleeve 13 formed with an enlarged or flared lower end 13a.

The tube 11 has fitted in its outer or lower end, a hollow needle 14, which projects beyond the tube 11, the projecting portion of said needle 14 being screwed into the portion held within the tube 11, to facilitate replacement in the event of the needle point being damaged or broken.

The passage in the needle 14 is open to the interior of the tube 11, the inner end of said passage being surrounded by a seating for a valve 15 attached to the sliding sleeve 13 by a screw 16 which operates in a slot 11a in the tube 11, said valve 15 being tapered to facilitate its entry into the upper end of the tube 11.

The needle point is solid with a plurality of discharge orifices 14a at the sides thereof.

A spring 17 in compression between an internal ledge 18 on the sleeve 13, and an external edge 19 on the tube 11, maintains the sleeve 13 forced towards the needle point, so that the latter projects only a short distance beyond the flared lower end 13a, and so that the valve 15 rests on its seating and closes the inner end of the needle.

In use for treating the roots of weeds with a weed destroying solution, such as a sulphur dioxide charged or impregnated aqueous solution containing caustic soda, and white arsenic, and with the required pressure set up in the container, and the nipple 6 open, the director nozzle is forced by means of the handles or grips 12 so that the projecting needle point enters the ground, the discharge orifices 14a being thereby covered.

Continued downward pressure applied to the director nozzle causes the needle 14 to pass further into the ground, and the flared lower end 13a of the sleeve 13 to come in contact with the latter, whereby said sleeve 13 is slid up the tube 11 against the action of the spring 17, and lifts the valve 15 from its seating allowing solution under pressure to pass from the container 1 through the flexible pipe 10, tube 11 and needle 14 into the ground.

Upon the needle 14 being withdrawn from the ground, the spring 17 slides the sleeve 13 down the tube 11 and reseats the valve 15 in and on the upper end of the needle 14, thereby preventing the escape of solution while the needle 14 is out of the ground.

By the means described, solution can be injected into the ground all round the weed, to effect a thorough spraying of the roots, which are receptive to the solution, with the result that the whole weed is utilimately destroyed.

The apparatus as described can also be used to spray solutions on trees and plants above the ground, or the director nozzle may be replaced by an ordinary spraying nozzle for the last mentioned operation.

What I do claim and desire to obtain by Letters Patent of the United States of America is:—

1. Apparatus for the purpose set forth comprising a container for a solution under pressure, means in communication with said container for generating pressure therein, a director nozzle fitting with a hollow needle through which the solution is discharged, a valve controlling the same and a slidable sleeve on the director nozzle adapted to operate said valve, said slidable sleeve being spring-operated and formed with an enlarged flared hollow end, thereby causing the valve to close the inner end of said needle.

2. Apparatus for the purpose set forth, comprising a container for holding a solution under pressure; means on said container for injecting gas into the solution in the latter; a pump on said container for generating air pressure therein; a flexible pipe connected by a cock controlled nipple with said container; a director nozzle on said pipe comprising a tube open at one end to the latter, and having a hollow needle fitted in its other end; a spring operated sleeve with a flared or enlarged lower end slidable on said tube; and a valve for opening and closing the inner end of the needle attached to said sleeve and operating therewith, all substantially as described and as illustrated in the drawing.

EDWARD HOPE.